US012565403B2

(12) United States Patent
Bütler et al.

(10) Patent No.: US 12,565,403 B2
(45) Date of Patent: Mar. 3, 2026

(54) ELEVATOR SYSTEM WITH SIMPLIFIED POWER SUPPLY FOR SHAFT DOOR ASSEMBLIES

(71) Applicant: Inventio AG, Hergiswil (CH)

(72) Inventors: Erich Bütler, Ebikon (CH); Christoph Liebetrau, Menziken (CH); Romeo Lo Jacono, Gravesano (CH); Valerio Villa, Colverde (IT)

(73) Assignee: INVENTIO AG, Hergiswil (CH)

( * ) Notice: Subject to any disclaimer, the term of this patent is extended or adjusted under 35 U.S.C. 154(b) by 976 days.

(21) Appl. No.: 17/755,156

(22) PCT Filed: Oct. 27, 2020

(86) PCT No.: PCT/EP2020/080168
§ 371 (c)(1),
(2) Date: Apr. 22, 2022

(87) PCT Pub. No.: WO2021/083889
PCT Pub. Date: May 6, 2021

(65) Prior Publication Data

US 2022/0363516 A1 Nov. 17, 2022

(30) Foreign Application Priority Data

Oct. 31, 2019 (EP) .................................... 19206588

(51) Int. Cl.
*B66B 13/14* (2006.01)
*B66B 1/34* (2006.01)
(Continued)

(52) U.S. Cl.
CPC .......... *B66B 13/143* (2013.01); *B66B 1/3423* (2013.01); *B66B 1/3446* (2013.01); *B66B 7/023* (2013.01); *B66B 13/24* (2013.01)

(58) Field of Classification Search
CPC ... B66B 13/143; B66B 1/3423; B66B 1/3446; B66B 7/023; B66B 13/24; B66B 7/02
See application file for complete search history.

(56) References Cited

U.S. PATENT DOCUMENTS

2011/0071682 A1* 3/2011 Reynolds .............. B66B 13/143 700/298

FOREIGN PATENT DOCUMENTS

CN 102653371 A 9/2012
CN 203513033 U 4/2014

(Continued)

*Primary Examiner* — Jeffrey Donels
(74) *Attorney, Agent, or Firm* — Shumaker, Loop & Kendrick, LLP

(57) ABSTRACT

An elevator system has a rail system and a shaft door assembly on each of a plurality of floors of a building. The rail system has an electrically conductive guide rail that extends along the plurality of floors and guides a vertically movable component of the elevator system, and an electrically conductive bracket on each of the floors anchoring the guide rail to a wall of the building. The guide rail is electrically conductively connected to each of the brackets. Each shaft door assembly has a movable shaft door for openable closing of a shaft opening of the floor and an associated control device and/or drive device for moving the shaft door; wherein the control device and/or drive device is supplied with electrical energy via two electrically conductive paths with a first of the electrically conductive paths being formed over at least parts of the rail system.

19 Claims, 1 Drawing Sheet

(51) Int. Cl.
*B66B 7/02* (2006.01)
*B66B 13/24* (2006.01)

(56) References Cited

FOREIGN PATENT DOCUMENTS

| | | | | | |
|---|---|---|---|---|---|
| CN | 107000985 | A | | 8/2017 | |
| EP | 1321418 | A1 | | 6/2003 | |
| EP | 3398899 | A1 | | 6/2006 | |
| EP | 2738132 | A1 | * | 6/2014 | ............ B66B 1/302 |
| EP | 1674419 | A1 | | 11/2018 | |
| WO | WO-2012014222 | A1 | * | 2/2012 | .............. B66B 7/00 |
| WO | 2012044386 | A1 | | 4/2012 | |
| WO | 2016096763 | A1 | | 6/2016 | |

* cited by examiner

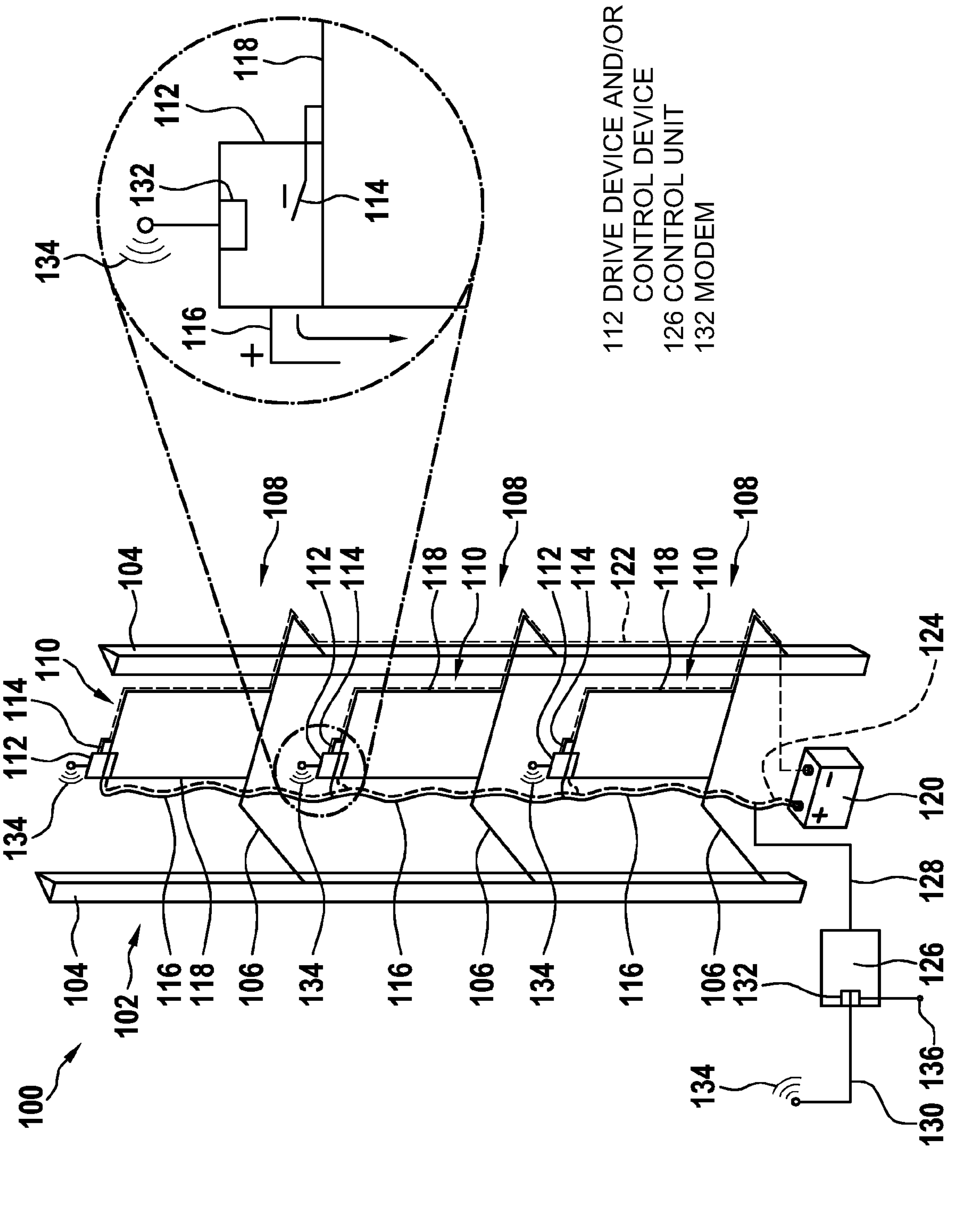
112 DRIVE DEVICE AND/OR
CONTROL DEVICE
126 CONTROL UNIT
132 MODEM

ELEVATOR SYSTEM WITH SIMPLIFIED POWER SUPPLY FOR SHAFT DOOR ASSEMBLIES

FIELD

The present invention relates to a passenger transport device in the form of an elevator system.

BACKGROUND

In a conventional elevator system, a shaft door, which can be selectively closed and released between a floor in a building and an elevator shaft, typically does not have its own drive. Instead, such a passive shaft door is also driven by a door drive of a car of the elevator system. For this purpose, the car can have a driver which is connected to the door drive of the car. The driver can engage in a drive mechanism of the shaft door when the car stops at the floor. The drive mechanism can be unlocked while the car is approaching the floor. The drive mechanism can be locked while the car travels away from the floor. By means of the drive via the driver, all shaft doors of the elevator system can be moved using one of the door drives of the car. Only the shaft door of the floor on which the car is currently located is opened. For maintenance purposes or in an emergency, the shaft door can be unlocked via a lock and opened manually.

However, elevator systems having passive shaft doors require, inter alia, very precise positioning of the shaft doors relative to the car such that the drive mechanism of the shaft door can interact with the mechanism on the car. In order for the driver to be able to engage in all the drive mechanisms of the shaft doors, each floor of a building typically requires an adjustment of a connecting link of each drive mechanism to the driver to very close tolerances. These tolerances are significantly smaller than building tolerances of the building on each floor.

In order in particular to be able to avoid adjustment work for such precise relative positioning, elevator systems are being developed in which the shaft doors are designed as active units, i.e., in which each shaft door has its own drive device.

However, this can result in increased complexity during the installation of the elevator system, for example in order to connect the various drive devices to a power supply.

Furthermore, there may be a requirement for each shaft door to have a control device, for example, for blocking all doors during normal operation and for unblocking a specific door for maintenance work.

SUMMARY

There may be a requirement for an improved elevator system, among other things. In particular, there may be a requirement for an elevator system having active shaft doors, the assembly of which results in reduced installation complexity.

A requirement of this kind can be met by an elevator system according to the advantageous embodiments that are defined in the following description of the invention.

According to one aspect of the invention, an elevator system which has a rail system and at least one shaft door assembly on each of a plurality of floors of a building is proposed. The rail system has at least one guide rail which extends along the plurality of floors and is configured for guiding a vertically movable component of the elevator system. The guide rail is electrically conductive. Furthermore, the rail system has at least one bracket on at least one, preferably each, of the floors, wherein at least one, preferably each, bracket anchors the guide rail to a wall of the building. At least one, preferably each, of the brackets is electrically conductive. In the rail system, the guide rail is electrically conductively connected to at least one, preferably each, of the brackets. Each shaft door assembly has a movable shaft door for openable closing of a shaft opening of the floor, wherein at least one, preferably each, shaft door assembly has a control device and/or drive device for moving the shaft door. The control device and/or drive device is to be supplied with electrical energy via two electrically conductive paths. A first of the electrically conductive paths is formed over at least parts of the rail system.

The control device as described above and below can be a door control device and can be provided for controlling a door lock, among other things. For example, the controller makes it possible for the door lock to be blocked or opened. Other functions of the door controller are well known to a person skilled in the art.

Possible features and advantages of embodiments of the invention can be considered, inter alia and without limiting the invention, to be based upon the concepts and findings described below.

An elevator system can be a passenger transport system having at least one vertically movable car. The car can be moved up and down between stops on different floors or stories of a building by a drive system. The drive system can be connected to the car via cables and/or belts. The car can be guided vertically by a rail system. The rail system can prevent lateral movements of the car. The weight of the car can be compensated for by a counterweight. The rail system can also guide the counterweight vertically. The counterweight can be moved up and down in the opposite direction to the car.

The rail system can have one or more guide rails and one or more brackets, wherein the guide rails can be anchored to shaft walls of an elevator shaft via the one or more brackets. In addition to its function of laterally guiding the car and/or the counterweight, the rail system can be a load-bearing component of the elevator system. Alternatively or in addition, the rail system can further act as a stationary brake component, i.e., the car can brake its movement by forces being transmitted to guide rails of the rail system via brakes. The rail system can be made of a metal material. The rail system can have cross sections and material thicknesses which are dimensioned to suit the load. The components of the rail system can be screwed together directly or indirectly, for example via tabs or splice plates. The components of the rail system can lie flat against one another in the region of screw connections. Due to the large contact surfaces, a low electrical contact resistance between the components of the rail system can be achieved. All components of the rail system can be on a common electrical potential. The electrical potential of the rail system can correspond to a ground potential, for example.

A guide rail can support a weight of the elevator system or forces acting in the elevator system at least partly on a foundation of the elevator system. Brackets of the rail system can be referred to as brackets and can be arranged at approximately regular intervals along the guide rail. The bracket can divert sideways or lateral forces into the building. The brackets can be placed between the floors of the building. For example, a bracket can be arranged between a ceiling level of a lower floor and a floor level of an upper floor. The guide rail can be arranged at the end of an arm of the bracket. The bracket can be connected to the building at an opposite end of the arm. The bracket can be screwed to a wall of the building, for example. The brackets, which are arranged one above the other, can be aligned with the vertical independently of the wall. The guide rail can be aligned with the vertical.

The rail system can also have two guide rails, for example. Then the car can be arranged between the guide rails. The brackets may have two arms and be C-shaped. A central region of the two-armed bracket can be connected to the building.

A shaft door assembly can have a one-part or multi-part shaft door, a guide for the shaft door and an electrical control device and/or drive device. The shaft door assembly can be arranged at a shaft opening of each floor to the elevator shaft. The shaft door assembly closes the shaft opening except for a passage cross section which can be released by the shaft door. The shaft door can be a sliding door, for example. The shaft door can be a telescopic door or a centrally opened door. Segments of the telescopic door can be coupled to the drive device via a coupling mechanism. The shaft door can be moved in the guide between an open position and a closed position by means of the drive device. In the closed position, the shaft door closes the passage cross section. In the open position, the passage cross section is not closed.

In the approach presented here, each shaft door has its own control device and/or drive device. Accordingly, the shaft door can be opened and closed without having to interact with the car or its drive mechanism. Thus, an adjustment of the shaft door assembly can be simplified and can be carried out substantially in accordance with visual considerations and can be carried out significantly faster.

In addition, the individual control device and/or drive device can be actuated separately for maintenance purposes or in an emergency, i.e., can open and close independently in response to a specific control command. For example, the car can be positioned in the elevator shaft in such a way that a car roof of the car is arranged substantially at the same height as a threshold of a shaft door. This allows service personnel to access the car comfortably and safely to carry out maintenance work in the elevator shaft.

A first and a second electrically conductive path, via which the control device and/or drive device can be supplied with electrical energy, can each consist of electrical conductors which are electrically conductively connected to one another. The electrically conductive path can be referred to as a current path.

At least subregions of the first path are formed by at least parts of the rail system. In other words, at least subregions of an electrical connection formed by the first path are formed by parts of the rail system, i.e., by its at least one guide rail and/or its at least one bracket. Since the rail system has to be provided along the entire travel path of the elevator system and is usually made up of electrically conductive components anyway, the rail system can simply form a subregion of the first path for the electrical supply to shaft door assemblies on different floors. At least for this first path, separate cabling does not necessarily have to be installed individually to each of the control devices and/or drive devices of the various shaft door assemblies. Other subregions of the first path can also be formed by cables or the like. The second path can be formed independently of the rail system.

According to an embodiment, each control device and/or drive device can be electrically connected to one of the brackets on each of the floors. The control device and/or drive device can, for example, be connected to the bracket of the floor at which each shaft door assembly is installed. Each control device and/or drive device can be connected separately to a bracket. A cable can be arranged in the first path between the control device and/or drive device and the bracket.

According to an embodiment, each control device and/or drive device can be electrically connected to a nearest one of the brackets on each of the floors. The nearest bracket can also be the bracket of the floor above if the control device and/or drive device is arranged above the shaft door. By using the closest bracket, a minimum line length of the electrically conductive path can be used.

According to an embodiment, the shaft door assembly can have an electrically conductive frame. The control device and/or drive device can be electrically conductively connected to the frame. The frame can be electrically conductively connected to an associated one of the brackets. The frame can be on the same electrical potential as the rail system. The frame can be part of the first electrically conductive path. By using the frame, a separate cable for connecting the control device and/or drive device can be dispensed with in the first path. The control device and/or drive device can be connected directly to the frame. The frame can be screwed to the bracket, for example.

According to an embodiment, a second of the electrically conductive paths is formed by a cable. The cable can be arranged so as to be electrically isolated from the rail system. All control devices and/or drive devices can be connected to one another via a cable. The cable can have branches on the floors to each control device and/or drive device. Alternatively, a separate cable can be laid for each control device and/or drive device.

According to an embodiment, the elevator system can further have an energy supply device for supplying electrical energy to the control device and/or drive device of all the shaft door assemblies. An energy supply device can provide a specific voltage. The energy supply device can have a voltage converter for converting mains voltage into the specific voltage. The voltage can be converted using a transformer. The voltage can be converted by an electrical circuit. The energy supply device can be designed to rectify the mains voltage into a DC voltage. The energy supply device can have an energy store. The energy store can be an accumulator and/or an electrostatic store, for example in the form of a capacitor, in particular a supercapacitor. Due to the energy store, the energy supply device can also provide electrical energy in the event of a power failure. The energy supply device can have a charger for the energy store. The energy store can be charged and discharged via a battery management system. The energy supply device can be arranged in the elevator system, for example in its elevator shaft, or at another point in a building accommodating the elevator system. The energy supply device can be connected to each of the control devices and/or drive devices of the various shaft door assemblies via the two electrically conductive paths. For this purpose, at least one pole or one electrical connection of the energy supply device can be electrically connected to the rail system so that subregions of the rail system can form parts of the first electrically conductive path.

According to an embodiment, the energy supply device can be configured to provide electrical energy having an electrical voltage of less than/equal to 60 V, in particular 48 V. The energy supply device can provide DC voltage in the low-voltage range. 48 volts can be conducted via the rail system without any further protective measures. 48 V can be sufficient to provide enough power to move one shaft door at a time. A 48 V-supply is easy and safe to set up. Components from other fields of technology, such as vehicle technology, can be used inexpensively and without the need for in-house development.

According to an embodiment, a control unit of the elevator system can be connected to the shaft door assembly via one of the electrically conductive paths. A control unit can be a higher-level control unit for controlling the entire elevator system. The control unit can be connected to electronics of the shaft door assembly via the rail system and/or the line. The electronics can be supplied with energy via the electrically conductive paths.

According to an embodiment, the elevator system can be designed to communicate at least critical safety information between the control unit and one of the control devices and/or drive devices via one of the electrically conductive paths. Critical safety information can be, for example, clearance for the control device and/or drive device of the shaft door. The critical safety information can also be a position report about a current closed state of the shaft door or a current position of the car. The critical safety information can be communicated via the rail system and/or the line. The critical safety information can preferably be communicated via the cable since there are few disruptive influences on the cable. The cable can be shielded. The cable can have a different, in particular lower, electrical resistance than the rail system.

According to an embodiment, the control unit can be configured to communicate the critical safety information by modulating an electrical signal encoding the information onto an electrical current used to supply energy to the control device and/or drive device. The control unit can be designed to mix an alternating voltage signal or alternating current signal representing the information with a direct current used for the energy supply on the electrically conductive path. By mixing DC and AC, the information can be easily demodulated at the shaft door assembly.

According to an embodiment, the elevator system can be designed to wirelessly communicate non-critical safety information between the control unit and one of the drive devices. Non-critical safety information can, for example, be additional information such as event information for users of the elevator system. The non-critical safety information can also be weather information. The elevator system can be operated independently of the non-critical safety information. The control unit and the shaft door assembly can have transceiver units for wireless communication. Antennas for wireless communication can be placed in the elevator shaft. Communication between the control unit and the shaft door assemblies may be encrypted.

According to an embodiment, each of the shaft door assemblies further has a modem which is configured to generate a wireless access point to a data network. Since at least one shaft door assembly is generally provided on each floor of a building, wireless access to a data network can be provided in a simple manner throughout the building using the modems accommodated therein. The modems can be networked with one another. An access point can in particular be accessible to users of the elevator system, but can also be available in other regions of the building. User devices can dial into the access point. An access point can be referred to as a network hotspot.

According to an embodiment, energy can be supplied to the modems via the same first and second electrically conductive paths as those for the control devices and/or drive devices. Like the control devices and/or drive devices, the modems can be supplied with energy at least in portions using the rail system. As a result, a power supply which is easy to install and, in particular, does not have a high outlay on cabling and is reliable in operation can be provided.

According to an embodiment, data can be transmitted between one of the modems and a central Internet access point via one of the electrically conductive paths. The data can be transmitted by modulating an encoded electrical data signal onto the electrical current used for supplying the control device and/or drive device with energy. Data can be transmitted in both directions via the path.

According to an embodiment, the modems on adjacent shaft door assemblies can be configured to form a common data network between the control unit and each of the shaft door assemblies. The modems can form overlapping cells. Data can be passed on as with a repeater.

The elevator system can in particular be designed to wirelessly communicate at least non-critical safety information between the control unit and one of the control devices and/or drive devices via the common data network spanned by the modems. Different data streams can be mixed in the data network. The data streams can be separated again at the individual modems.

It must be noted that some of the possible features and advantages of the invention are described herein with reference to different embodiments of the elevator system and the configurations possible in this elevator system for power supply and/or data transmission from their shaft door assemblies. A person skilled in the art will recognize that the features may be combined, adapted, or exchanged as appropriate in order to arrive at further embodiments of the invention.

Embodiments of the invention will be described below with reference to the accompanying drawings, with neither the drawings nor the description being intended to be interpreted as limiting the invention.

DESCRIPTION OF THE DRAWINGS

FIG. 1 shows a view of an elevator system having a power supply according to an embodiment.

The FIGURE is merely schematic and not to scale. The same reference signs indicate the same or equivalent features.

DETAILED DESCRIPTION

FIG. 1 shows a view of an elevator system 100 having a power supply according to an embodiment. The elevator system 100 has a rail system 102 made of two guide rails 104 and three brackets 106. The elevator system 100 here connects three floors 108 of a building to one another. The elevator system 100 has a shaft door assembly 110 in each of the three connected floors 108. In the approach presented here, the shaft door assemblies 110 are supplied with power via the rail system 102. The shaft door assemblies 110 are each arranged at a shaft opening of each of the floors 108.

The rail system 102 guides vertically movable components (not shown here) of the elevator system 100 on their travel paths. A car of the elevator system 100 is guided between the guide rails 104. A counterweight to the car is guided on at least one of the guide rails 104. A drive (not shown here for the sake of simplicity) of the elevator system 100 is arranged at an upper end of the guide rails 104. A drive roller (not shown) of the drive is used to drive suspension means (not shown) of the car and the counterweight, such as belts or cables, via which the car is moved up and down between the guide rails 104.

The guide rails 104 are substantially vertical in an elevator shaft of the building. The elevator shaft is a continuously free, vertical space in the building. The elevator shaft can also be arranged on an outside of the building. The brackets 106 are connected to the guide rails 104 and connect the guide rails 104 to a wall (not shown) of the elevator shaft. One of the brackets 106 is arranged under each of the shaft door assemblies 110. The brackets 106 are screwed to the guide rails 104, for example. Due to the screw connection, the brackets 106 and the guide rails 104 are electrically conductively connected to one another and are at a common electrical potential.

The shaft door assemblies 110 each have an electric drive device 112 for driving a shaft door (not shown here) of the shaft door assembly 110. In the approach presented here, power is supplied to drive devices 112, at least in portions, via the rail system 102. The drive device 112 is designed to open and close the shaft door independently of a car door of the cabin car.

In an embodiment, a first pole of a drive device 112 is connected to one of the brackets 106 via a first electrical conductor 114. A second pole of the drive device 112 is electrically isolated from the rail system 102 and is connected to its own electrical conductor 116. The electrical conductors 114, 116 can be cables or busbars, for example. The second electrical conductor 116 can, for example, extend substantially in parallel with the rail system 102 within the elevator shaft.

In an embodiment, the shaft door assemblies 110 each have an electrically conductive frame 118. The frame 118 of a shaft door assembly 110 is screwed to the bracket 106 underneath in each case. The frames 118 are thus electrically conductively connected to the rail system 102. The first pole of the drive device 112 is electrically conductively connected to the frame 118. The first pole can be connected directly to the frame 118. Likewise, the first electrical conductor 114 can be arranged between the first pole of the drive device 112 and the frame 118.

The first pole can also be connected to the nearest bracket 106. The nearest bracket 106 can be the bracket 106 located above the drive device 112 in each case. If the drive device 112 is arranged above the frame 118, a short first conductor 114 can be used.

In an embodiment, the elevator system 100 has its own energy supply device 120. The energy supply device 120 makes direct current or direct voltage available. For example, the energy supply device 120 supplies the shaft door assemblies 110 with 48 volts of DC voltage via the rail system 102. For this purpose, a negative pole of the energy supply device 120 is connected to the rail system 102 via a further electrical conductor (dashed line). A positive pole of the energy supply device 120 is connected to the separate second electrical conductor 116. The rail system 102 is therefore grounded, analogously to the body of a vehicle. By using the rail system as a ground, there is no need for continuous two-wire cabling. The rail system 102 is therefore a component of a first electrically conductive path 122 between the drive devices 112 and the energy supply device 120. A second electrically conductive path 124 which is electrically isolated from the first path 122 is formed by the second electrical conductor 116 or the separate cable which is electrically isolated from the rail system 102.

The energy supply device 120 can be dimensioned to be small or low-power since generally only one of the drive devices 112 is operated at a time, while the other drive devices 112 are inactive. A drive device 112 can, for example, require less than 500 watts, for example 100 watts, of electrical power.

The energy supply device 120 can have an energy store or energy buffer store. The energy store can be constantly kept at a predetermined state of charge. In the event of a power failure, the energy store continues to ensure the power supply to the shaft door assemblies 110.

In an embodiment, a control unit 126 of the elevator system 100 is connected to the shaft door assemblies 110 via one of the electrically conductive paths 122, 124. The control unit 126 can be connected to the shaft door assemblies 110 via a power line communication, for example. The control unit 126 is designed to synchronize the opening and closing of the shaft doors with the opening and closing of a car door of the car. To do this, the control unit 126 sends critical safety information 128 to the shaft door assemblies 110, for example via one of the electrical paths 122, 124 used for the power supply. The critical safety information 128 is modulated onto the DC voltage in the first path 122 or second path 124 and is received by control electronics of the shaft door assemblies 110. Here, the critical safety information 128 is modulated onto the second path 124 since the busbar or the cable of the second path 124 consists of a material with a higher electrical conductivity than the rail system 102.

Critical safety information 128 corresponding to a safety integrity level three is, for example, a state of each shaft door, a state of a lock of the shaft door and position information about a position of the car. Position information of a cabin car floor of the car can be sent as position information. The shaft door may only be opened when the car is in a safe position. In addition, position information of a car roof of the car can be provided as position information. Using the position information of the car roof, the car can be stopped for maintenance work in such a way that the car roof is arranged at the height of a shaft door. Then clearance to open the shaft door can be given so that service personnel can climb onto the car.

Non-critical safety information 130 can also be exchanged wirelessly between the control unit 126 and the shaft door assemblies 110. For this purpose, the shaft door assemblies 110 and the control unit 126 have modems 132 for wireless communication. In an embodiment, the modems 132 are integrated into the drive devices 112 and are supplied with energy via the first path 122 and the second path 124.

The modems 132 are networked to one another in an embodiment and provide a wireless data network 134. The modems 132 may be networked as a mesh. This data network 134 can be a WLAN, for example. The modems 132 can additionally be networked via the path or paths 122, 124 in order to compensate for transmission problems. The individual modems 132 can access an Internet access point 136 via the path or paths 122, 124 in order to provide the Internet access point 136 in the data network 134. The Internet access point 136 can be provided as a hotspot. Users of the elevator system 100 can thus access the Internet via the data network 134 while they are being transported by the elevator system 100 or are waiting for the car. The non-critical safety information 130 can also be transported via the data network 134.

In an embodiment (not shown), a control device 112 is present instead of the drive device 112. In this embodiment, the shaft doors are only passive, i.e., can be driven by the car doors. The control device 112 controls, inter alia, a door lock by means of which the shaft door can be blocked.

In an embodiment (not shown), instead of only the drive device 112, a drive device 112 and a control device 112 are present. Thus, the shaft door device 112 represents a drive device and/or a control device.

Finally, it should be noted that terms such as "comprising," "having," etc., do not preclude other elements or steps and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:

a shaft opening at each floor of a plurality of floors of a building having a shaft door assembly, each of the shaft door assemblies being operable to open and close the shaft opening;

a rail system having a guide rail that extends along the plurality of floors and is adapted for guiding a vertically movable component of the elevator system, the guide rail being electrically conductive, and a bracket adjacent to each of the floors anchoring the guide rail to a wall of the building, the brackets being electrically conductive;

wherein the guide rail is electrically conductively connected to each of the brackets;

wherein each of shaft door assemblies has a shaft door device being a drive device and/or a control device for operating the shaft door assembly;

wherein each of the shaft door devices is supplied with electrical energy via two electrically conductive paths; and wherein a first of the electrically conductive paths is formed over at least parts of the rail system.

2. The elevator system according to claim 1 wherein each of the shaft door devices is electrically connected to one of the brackets.

3. The elevator system according to claim 1 wherein each of the shaft door devices is electrically connected to a nearest one of the brackets.

4. The elevator system according to claim 1 wherein each of the shaft door assemblies has an electrically conductive frame with the shaft door device electrically conductively connected to the frame and the frame is electrically conductively connected to one of the brackets.

5. The elevator system according to claim 1 wherein a second of the electrically conductive paths is formed by a cable.

6. The elevator system according to claim 1 including an energy supply device supplying the electrical energy to the shaft door devices via the electrically conductive paths.

7. The elevator system according to claim 6 wherein the energy supply device provides the electrical energy having an electrical voltage not exceeding 60 V.

8. The elevator system according to claim 6 wherein the energy supply device provides the electrical energy having an electrical voltage of 48 V.

9. The elevator system according to claim 1 including a control unit connected to the shaft door assemblies via one of the electrically conductive paths.

10. The elevator system according to claim 9 wherein critical safety information of the elevator system is communicated between the control unit and the shaft door devices via the one of the electrically conductive paths.

11. The elevator system according to claim 10 wherein the control unit communicates the critical safety information by modulating an electrical signal encoding the information onto an electrical current used to supply the electrical energy to the shaft door devices.

12. The elevator system according to claim 1 including a control unit and wherein non-critical safety information of the elevator system is wirelessly communicated between the control unit and the shaft door devices.

13. The elevator system according to claim 1 wherein each of the shaft door assemblies has a modem that generates a wireless access point to a data network.

14. The elevator system according to claim 13 wherein electrical energy is supplied to the modems via the electrically conductive paths.

15. The elevator system according to claim 13 wherein data is transmitted between one of the modems and a central Internet access point via one of the electrically conductive paths.

16. The elevator system according to claim 13 including a control unit and wherein the modems associated with adjacent ones of the shaft door assemblies form a common data network between the control unit and the shaft door assemblies.

17. An elevator system comprising:

a shaft door assembly arranged at a shaft opening at each floor of a plurality of floors of a building, each of the shaft door assemblies being operable to open and close the shaft opening;

a rail system having a guide rail that extends along the plurality of floors and is adapted for guiding a vertically movable component of the elevator system, and a bracket adjacent to each of the floors anchoring the guide rail to a wall of the building, the guide rail and the brackets being electrically conductive and the guide rail being electrically conductively connected to each of the brackets;

wherein each of shaft door assemblies has a drive device and/or a control device for operating the shaft door assembly; and wherein each of the drive devices and control devices is supplied with electrical energy via two electrically conductive paths with a first of the electrically conductive paths being formed by the guide rail and the brackets.

18. The elevator system according to claim 17 wherein each of the shaft door assemblies has an electrically conductive frame with the drive device and/or control device electrically conductively connected to the frame and the frame is electrically conductively connected to one of the brackets.

19. The elevator system according to claim 17 wherein a second of the electrically conductive paths is formed by a cable.

* * * * *